Sept. 5, 1933.  F. ERZNOZNIK  1,925,179
TRAILER BRAKE
Filed Jan. 14, 1932  3 Sheets-Sheet 1
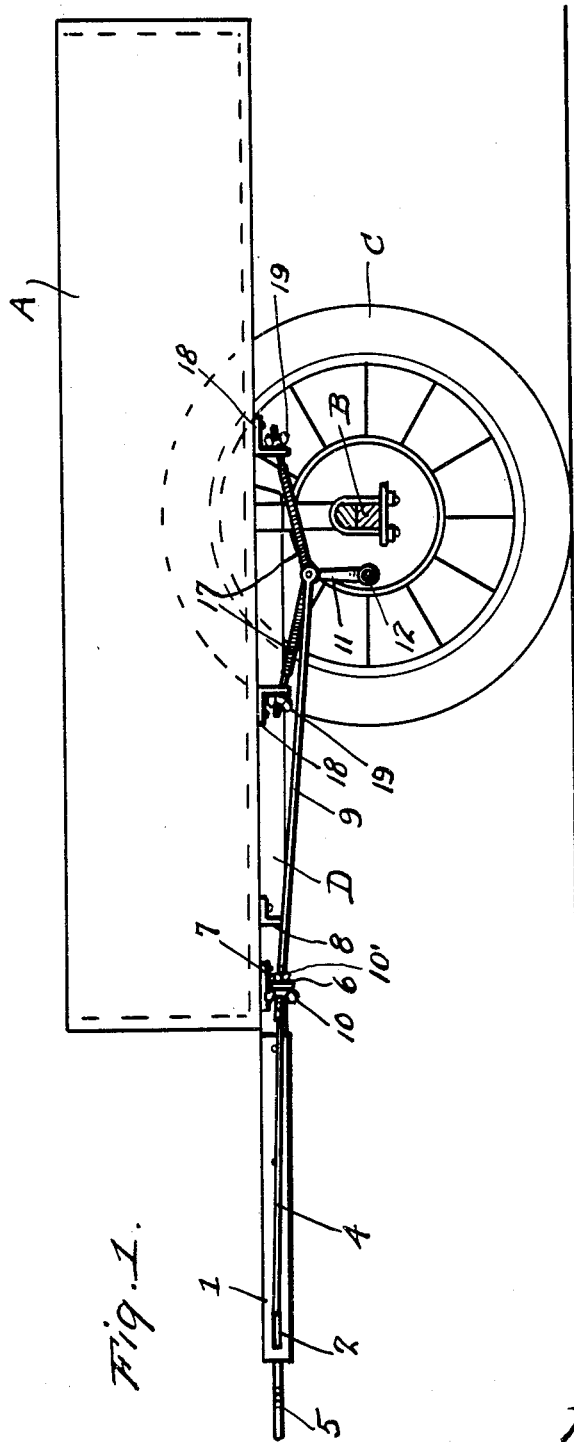
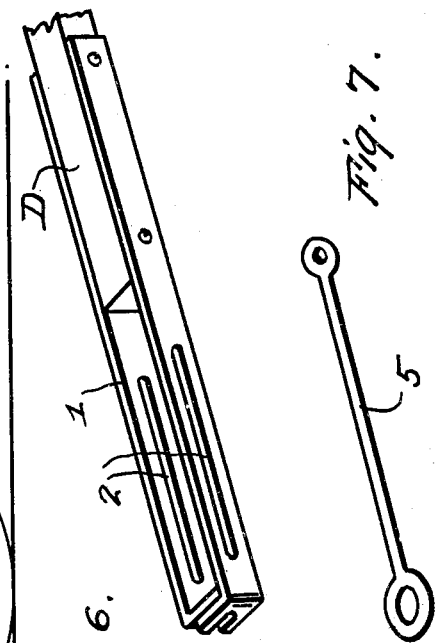
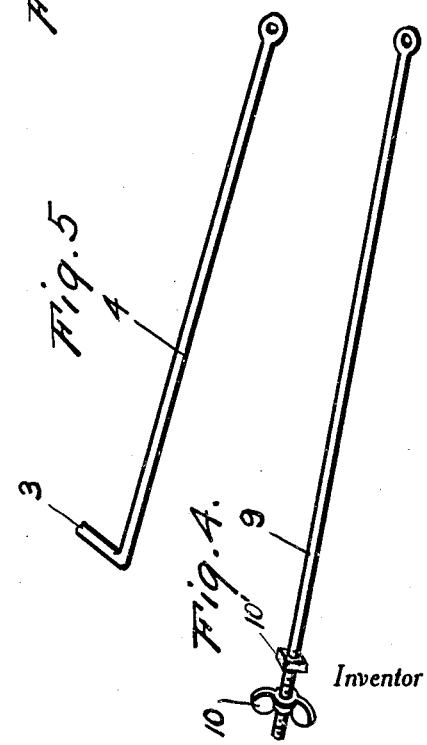
Inventor
Frank Erznoznik
By Clarence A. O'Brien
Attorney

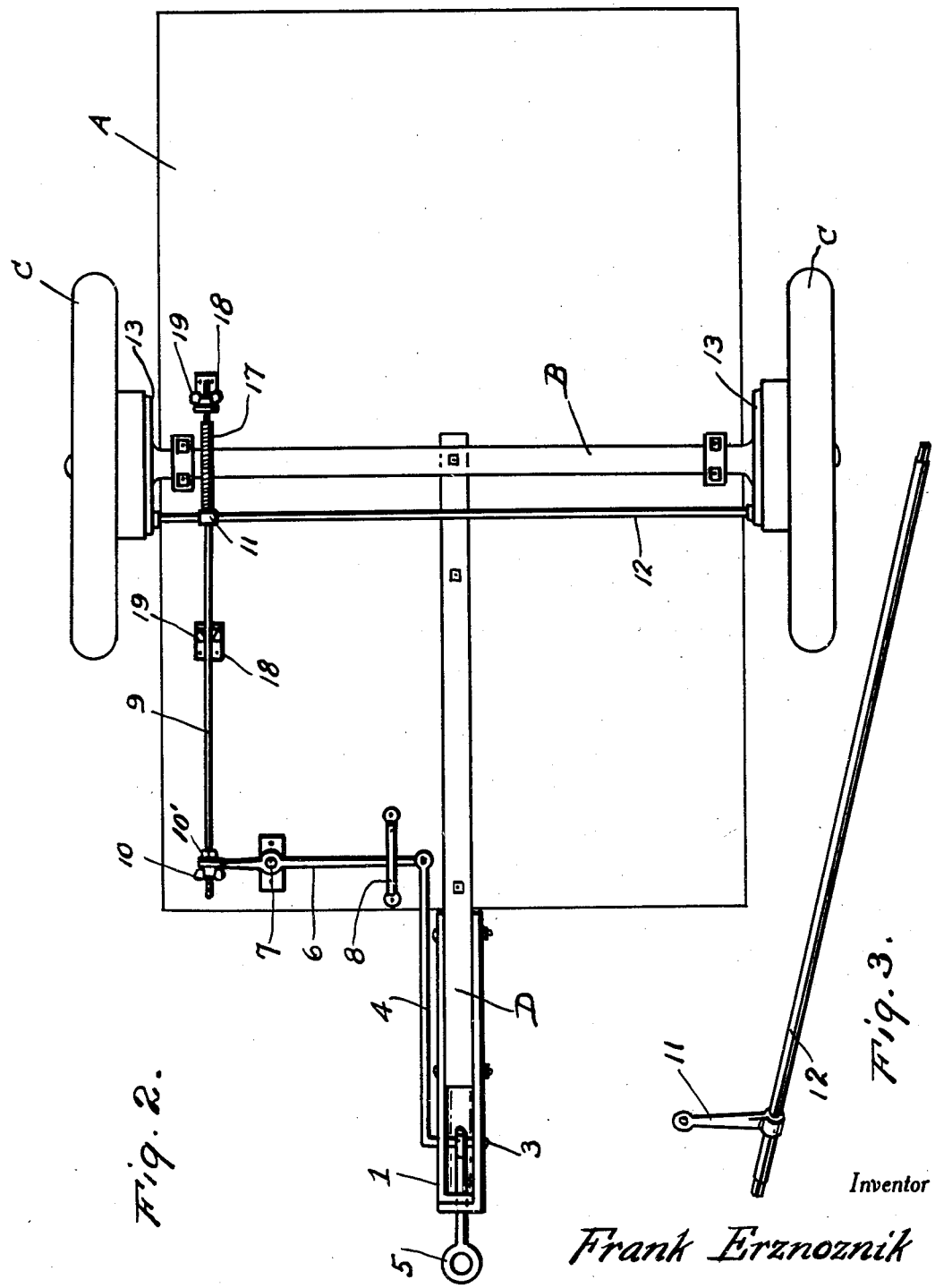

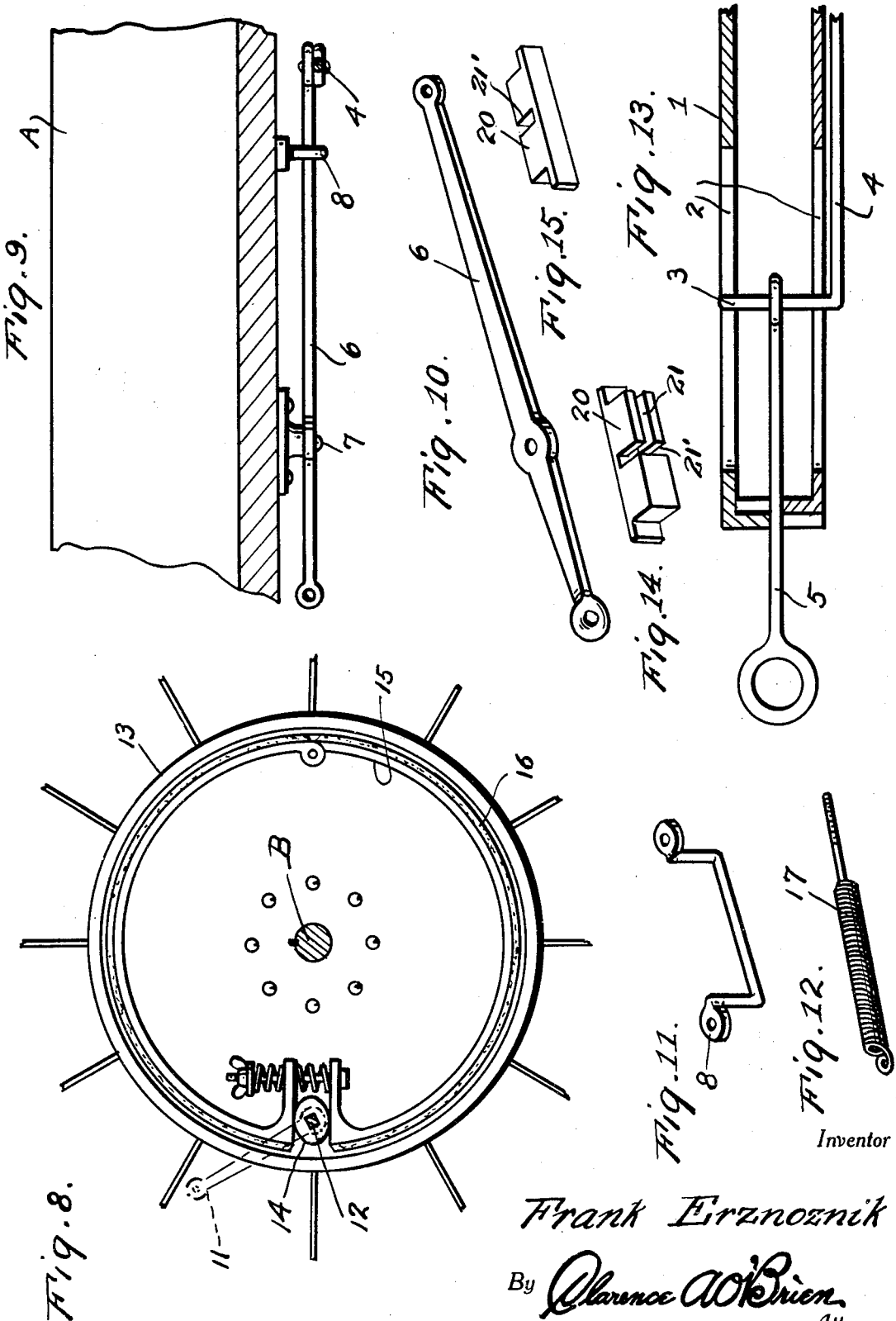

Patented Sept. 5, 1933

1,925,179

UNITED STATES PATENT OFFICE 1,925,179

TRAILER BRAKE

Frank Erznoznik, Iowa City, Iowa

Application January 14, 1932. Serial No. 586,675

2 Claims. (Cl. 188—142)

This invention relates to a brake for a trailer, the general object of the invention being to provide means for holding the brake unapplied when the trailer is being pulled by the automobile or other pulling device, but will be automatically applied when the trailer moves by momentum or gravity towards the towing vehicle so that the forward movement of the trailer will be checked.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation with parts in section showing a trailer equipped with the invention.

Fig. 2 is a bottom plan view of the device.

Fig. 3 is a view of the cross shaft for operating the brakes.

Fig. 4 is a view of the link which connects the lever to the arm of the shaft.

Fig. 5 is a view of the hook link, which connects the lever to the sliding draw bar.

Fig. 6 is a view of the front end of the tongue with the yoke member thereon.

Fig. 7 is a view of the draw bar.

Fig. 8 is a sectional view through the brake drum of one of the wheels showing the internal brake mechanism.

Fig. 9 is a fragmentary sectional view through the trailer showing the lever and its guide.

Fig. 10 is a view of the lever.

Fig. 11 is a view of the guide for the lever.

Fig. 12 is a view of one of the springs.

Fig. 13 is a sectional view through the yoke.

Figs. 14 and 15 are views of the block used to render the device inoperative.

In these drawings the letter A indicates the body of the trailer, the letter B the axle thereof, and the letter C the wheels and the letter D indicates the tongue which is provided with a yoke 1 at its forward end, preferably formed of two plates fastened to opposite sides of the tongue and extending in front thereof with the front ends of the plates bent and overlapping each other as clearly shown in Fig. 13.

The plates are provided with longitudinally extending slots 2 for slidingly receiving the bent end 3 of a link 4. The draw bar 5 passes through the slotted bend ends of the two plates 1 as shown in Fig. 13, and has an eye at its rear end which receives the bent end 3 of the link 4, and said draw bar is formed with a large eye at its front end for receiving a part of the towing vehicle.

A lever 6 is pivoted to the lower face of the bottom of the trailer body as shown at 7 and the rear end of the link 4 is pivoted to the inner end of this lever. A guide 8 is fastened to the bottom of the body and guides the inner end of the lever in its movement. The other end of the lever is adjustably connected to a link 9 by the nuts 10 and 10' and the other end of the link 9 is connected to an arm 11 of a cross shaft 12 the ends of which extend into the brake housings 13 of the wheels C and are connected with the cams 14 which operate the brake bands 15 which of course are each provided with the usual brake lining 16 for engaging the inner face of the brake drum or housing 13.

Springs 17 are connected with the arm 11 and with the brackets 18 under the tractor and these springs can be adjusted by the thumb nuts 19 and can be so tensioned as to normally hold the brakes applied. However, when a pull is applied on the draw bar, the parts are so moved that the brakes are released but if the draw bar is pushed rearwardly, this rear movement is communicated to the lever by the link 4 and the lever communicates its movement to the link 9 so that the cross shaft 12 is turned in a direction to cause the cams 14 to apply the brakes and thus check the forward movement of the trailer.

The front spring 17 is so tensioned by the nut 19 and the rear spring 17 slackened as to cause the clutch spring to hold the parts with the brake normally applied, the front spring holding the arm 11 in its forward position with the cam tilted to expand the brake band 15 to engage the inner face of the brake drum. When a pull is exerted upon the bar 5, the member 4 swings the lever 6 so that the link 9 is moved rearwardly and thus the arm 11 is caused to move the cam to a position where the springs associated with the brake band 15 will contract the band, as shown in Fig. 8, and thus the brakes are released. If the tractor should move toward the towing vehicle, the lever 6 is moved in an opposite direction so that the link 9 is moved forwardly and thus the brakes are applied not only by the front spring 17 but also by the forward movement of the link 9 swinging the arm 11 forwardly to tilt the cam to expand the brake band 15.

When it is desired to render the braking device inoperative, block 20 shown in Figs. 14 and 15 is placed in the yoke to prevent movement of the parts as shown in dotted lines in Fig. 2, so that the brakes are held in releasing position. This block is formed with the grooves 21 and 21' arranged at right angles to each other and adapted to receive portions of the bar 5 and the bent end 3 so that the parts are held against movement with the link 4 in its forward position, with the brake released.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. In combination a trailer having brakes for its wheels, a yoke attached to the tongue of the trailer and having slots in its sides and an opening in its front end, a draw bar passing through the opening, a link having a portion paralleling the tongue with its front end bent and extending through the slots, means for connecting the rear end of the draw bar to said bent end of the link, a lever pivoted to the bottom part of the trailer and to the inner end of which the rear end of the link is pivoted, a link connected to the outer end of the lever, and means for connecting the rear end of the last-mentioned link to the brake means.

2. In combination, a trailer having brakes for its wheels, a yoke attached to the tongue of the trailer and having slots in its sides and an opening in its front end, a draw bar passing through the opening, a link having a portion paralleling the tongue with its front end bent and extending through the slots, means for connecting the rear end of the draw bar to said bent end of the link, a lever pivoted to the bottom part of the trailer and to the inner end of which the rear end of the link is pivoted, a link connected to the outer end of the lever, means for connecting the rear end of the last-mentioned link to the brake means, and a grooved block adapted to be placed in the yoke, the grooves engaging portions of the draw bar and the bent end of the link for holding the parts against movement with the parts in position for holding the brakes released.

FRANK ERZNOZNIK.